United States Patent
Ohtake et al.

(10) Patent No.: US 6,931,842 B2
(45) Date of Patent: Aug. 23, 2005

(54) REGENERATION OF DIESEL PARTICULATE FILTER

(75) Inventors: Makoto Ohtake, Yokohama (JP); Jun-ichi Kawashima, Yokosuka (JP); Naoya Tsutsumoto, Yokohama (JP); Munehiro Tabata, Isehara (JP); Terunori Kondo, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/694,011

(22) Filed: Oct. 28, 2003

(65) Prior Publication Data
US 2004/0103654 A1 Jun. 3, 2004

(30) Foreign Application Priority Data
Nov. 29, 2002 (JP) ........................ 2002-347394

(51) Int. Cl.$^7$ ................................ F01N 3/00
(52) U.S. Cl. ................ 60/295; 60/297; 60/285; 60/301; 60/280
(58) Field of Search .................. 60/295, 285, 297, 60/311

(56) References Cited

U.S. PATENT DOCUMENTS 5,042,248 A * 8/1991 Abthoff et al. ............. 60/274
6,247,311 B1    6/2001 Itoyama et al.
6,574,956 B1 * 6/2003 Moraal et al. ............. 60/295

FOREIGN PATENT DOCUMENTS

| DE | 43 30 830 A1 |   | 3/1995 |
|----|--------------|---|--------|
| EP | 1 382 812 A1 |   | 1/2004 |
| JP | 60-90914     | * | 5/1985 |
| JP | 4-31614      | * | 2/1992 |
| JP | 4-47120 A    |   | 2/1992 |
| JP | 5-44437 A    |   | 2/1993 |

* cited by examiner

Primary Examiner—Thomas E Denion
(74) Attorney, Agent, or Firm—Foley & Lardner LLP

(57) ABSTRACT

A filter (41) traps particulate matter contained in the exhaust gas of an engine (1). The filter (41) is regenerated by burning the trapped particulate matter by raising the temperature of the filter (41). When regeneration conditions are satisfied, a controller (31) raises the exhaust gas temperature to a first target exhaust gas temperature via an exhaust gas temperature adjusting mechanism (10) (S39), and burns the trapped particulate matter to regenerate the filter (41). When the engine (1) has rapidly decelerated during regeneration, the controller (31) decreases the exhaust gas temperature to a second target exhaust gas temperature lower than the first target exhaust gas temperature (S44, S45), and increases the exhaust gas flow rate (S52), thereby preventing the filter (41) from exceeding an upper limiting temperature.

10 Claims, 12 Drawing Sheets

26 DIAPHRAGM ACTUATOR
27 PRESSURE CONTROL VALVE
32 ACCELERATOR PEDAL DEPRESSION SENSOR
33 CRANK ANGLE SENSOR
34 WATER TEMPERATURE SENSOR
35 AIR FLOW METER
36 DIFFERENTIAL PRESSURE SENSOR
37, 38 TEMPERATURE SENSOR
44 DIAPHRAGM ACTUATOR
45 PRESSURE CONTROL VALVE

REGENERATION OF DIESEL PARTICULATE FILTER

FIELD OF THE INVENTION

This invention relates to regeneration of a diesel particulate filter which traps particulate matter in diesel engine exhaust gas.

BACKGROUND OF THE INVENTION

JP05-044437A published by the Japanese Patent Office in 1993 discloses a regeneration mechanism for a diesel particulate filter which traps particulate matter discharged by a diesel engine. The filter is installed in the exhaust passage of the engine. When particulate matter accumulates in the filter, the temperature of the filter is raised to burn the particulate matter by raising the exhaust gas temperature, and the particulate matter is thereby removed from the filter.

SUMMARY OF THE INVENTION

If the engine decelerates rapidly during regeneration, the exhaust gas flow rate decreases rapidly. The exhaust gas flowing into the filter supplies oxygen necessary for burning the particulate matter, and also has the function of radiating the surplus heat of the filter. Therefore, if the exhaust gas flow rate decreases rapidly during the regeneration, the amount of surplus heat radiated from the filter by the exhaust gas, decreases, but particulate matter that collects in the filter still keep burning. As a result, the temperature of the filter bed rapidly increases, and there is a possibility that the upper limiting temperature may be exceeded.

It is therefore an object of this invention to prevent the temperature of the filter bed from exceeding a proper range during sudden deceleration of the engine in filter regeneration.

In order to achieve the above object, this invention provides a regeneration device for a filter which traps a particulate matter contained in the exhaust gas of an engine. The device regenerates the filter by burning the particulate matter trapped in the filter by raising a temperature of the filter. The device comprises an exhaust gas temperature adjusting mechanism which adjusts a temperature of the exhaust gas, an exhaust gas flow rate adjusting mechanism which adjusts a flow rate of the exhaust gas, and a programmable controller.

The programmable controller is programmed to determine whether or not a regeneration condition for the filter is satisfied, raise the temperature of the exhaust gas to a first target exhaust gas temperature via the exhaust gas temperature adjusting mechanism when the regeneration condition is satisfied, determine whether or not the engine is in a predetermined rapid deceleration state, and control the temperature of the exhaust gas to a second target exhaust gas temperature lower than the first target exhaust gas temperature via the exhaust gas temperature adjusting mechanism while increasing the flow rate of the exhaust gas via the exhaust gas flow rate adjusting mechanism, when the engine is in the predetermined rapid deceleration state during regeneration.

This invention also provides a regeneration method for a filter which traps a particulate matter contained in the exhaust gas of an engine which is provided with an exhaust gas temperature adjusting mechanism which adjusts a temperature of the exhaust gas and an exhaust gas flow rate adjusting mechanism which adjusts a flow rate of the exhaust gas. The method regenerates the filter by burning the particulate matter trapped in the filter by raising a temperature of the filter.

The method comprises determining whether or not a regeneration condition for the filter is satisfied, raising the temperature of the exhaust gas to a first target exhaust gas temperature via the exhaust gas temperature adjusting mechanism when the regeneration condition is satisfied, determining whether or not the engine is in a predetermined rapid deceleration state, and controlling the temperature of the exhaust gas to a second target exhaust gas temperature lower than the first target exhaust gas temperature via the exhaust gas temperature adjusting mechanism while increasing the flow rate of the exhaust gas via the exhaust gas flow rate adjusting mechanism, when the engine is in the predetermined rapid deceleration state during regeneration.

The details as well as other features and advantages of this invention are set forth in the remainder of the specification and are shown in the accompanying drawings.

DESCRIPTION OF THE PREFERRED EMBODIMENTS

Figure 1:
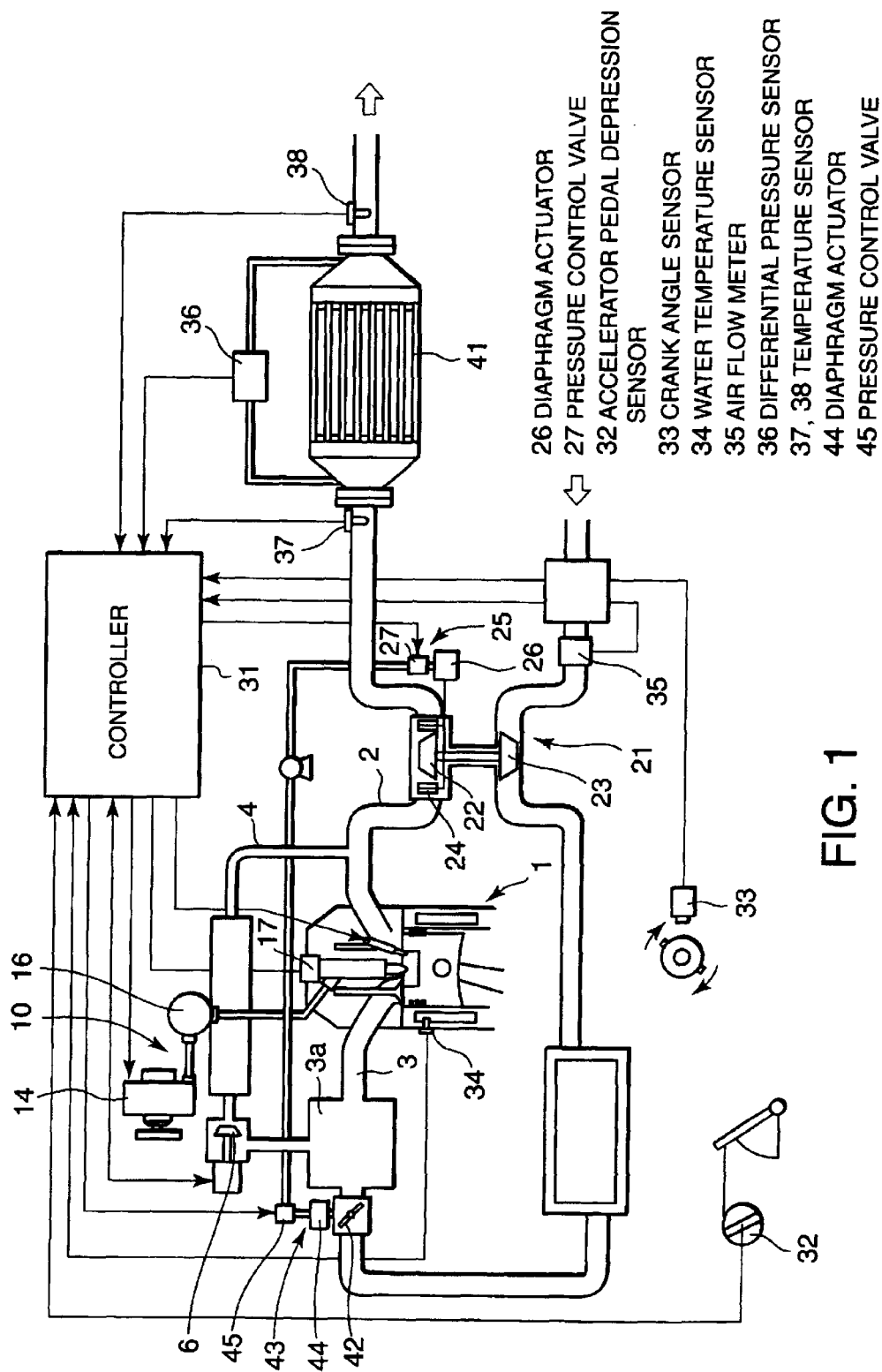
FIG. 1 is a schematic diagram of a diesel engine to which this invention is applied.

Referring to FIG. 1 of the drawings, a diesel engine 1 for a vehicle is provided with an exhaust passage 2 and an intake passage 3. The exhaust passage 2 and a collector 3a in the intake passage 3 are connected by an exhaust gas recirculation (EGR) passage 4. A diaphragm type EGR valve 6 is installed in the EGR passage 4. The EGR valve 6 is operated by a pressure control valve and a diaphragm actuator in response to a duty signal from an engine controller 31.

The engine 1 has a common rail type fuel injection device 10. The fuel injection device 10 comprises a fuel supply pump 14, a common rail (pressure chamber) 16 and a nozzle provided to each cylinder. Fuel pressurized by the supply pump 14 is distributed to each nozzle 17 via the common rail 16.

The nozzle 17 comprises a needle valve, nozzle chamber, fuel supply passage to the nozzle chamber, retainer, oil pressure piston and return spring. A three-way valve is a valve that selectively connects the fuel supply passage to the common rail 16 and a drain, and in the OFF state, the needle valve is held in the seated position by the high fuel pressure of the common rail 16 via the fuel supply passage and nozzle chamber. In the ON state, by opening this pressure to the drain, the needle valve is lifted and fuel in the nozzle chamber is injected into the cylinder. The engine 1 burns the injected fuel in the cylinder by compression ignition.

The fuel injection timing of the nozzle 17 is determined according to a change-over timing from switching the three-way valve from OFF to ON, and the fuel injection amount is determined by the time period for which the three-way valve remains ON. ON and OFF of the three-way valve are changed over by a signal from the engine controller 31.

This common rail fuel injection device 10 is known from U.S. Pat. No. 6,247,311.

A turbine 22 of a variable capacity turbocharger 21 is installed in the exhaust passage 2 downstream of the EGR passage 4. The variable capacity turbocharger 21 further comprises a compressor 23 installed in the intake passage 3. The turbine 22 converts the flow energy of the exhaust gas into rotation energy, and drives the compressor 23 arranged on the same axis by using this rotation energy. A variable nozzle 24 driven by an actuator 25 is installed at the scroll inlet of the turbine 22. The actuator 25 comprises a diaphragm actuator 26 and a pressure control valve 27 which regulates a pressure supply to the diaphragm actuator 26, and varies the nozzle opening to generate a predetermined turbocharging pressure from the low rotation speed region of the engine 1. Specifically, at low rotation speed, the nozzle opening is narrowed and the exhaust gas flow rate introduced into the turbine 22 is increased, while at high rotation speed, the nozzle opening is widened and exhaust gas is introduced into the turbine 22 without resistance. The pressure control valve 27 adjusts the pressure of the diaphragm actuator 26 according to a duty signal from the engine controller 31 so that the opening of the variable nozzle 24 corresponds to the target nozzle opening.

An air intake throttle 42 driven by an actuator 43 is installed at the inlet to the collector 3a. The actuator 43 operates under a diaphragm actuator 44 which drives the air intake throttle valve 42 in response to the control pressure and a pressure control valve 45 which adjusts the control pressure supplied to the diaphragm actuator 44. The pressure control valve 45 adjusts the pressure of the diaphragm actuator 44 according to a duty signal from the engine controller 31 so that the air intake throttle 42 has a target opening.

A diesel particulate filter 41 which collects particulate matter in exhaust gas is installed in the exhaust passage 2 downstream of the turbine 22.

The engine controller 31 comprises a microcomputer comprising a central processing unit (CPU), read-only memory (ROM), random access memory (RAM) and input/output (I/O) interface. The engine controller 31 may also comprise plural microcomputers.

The engine controller 31 controls the EGR valve 6, fuel injection timing and fuel injection amount of the nozzle 17, opening of the variable nozzle 24 of the turbocharger 21 and opening of the air intake throttle 42. Due to these controls, the particulate matter which has collected in the diesel particulate filter 41 is burnt, and the filter 41 is regenerated to a state where it can again trap particulate matter.

To perform the above control, detection signals from various sensors are input to the engine controller 31. These sensors include an accelerator depression sensor 32 which detects a depression amount of an accelerator pedal with which the vehicle is provided, a crank angle sensor 33 which detects a rotation speed Ne and crank angle of the engine 1, a water temperature sensor 34 which detects a cooling water temperature of the engine 1, an air flow meter 35 which detects an air flow rate Qa of the intake passage 2, a differential pressure sensor 36 which detects a differential pressure $\Delta P$ upstream and downstream of the diesel particulate filter 41, a temperature sensor 37 which detects a temperature T1 at the inlet of the filter 41, and a temperature sensor 38 which detects a temperature T2 at the outlet of the filter 41.

Next, the regeneration control of the diesel particular filter 41 performed by the engine controller 31 will be described.

When the differential pressure $\Delta P$ downstream of the diesel particular filter 41 reaches a regeneration start determining value $\Delta PHmax$, the engine controller 31 determines that particulate matter has collected in the filter 41 to such an extent that regeneration of the filter 41 is required. The exhaust gas temperature is then controlled to the target exhaust gas temperature under predetermined conditions so that regeneration treatment is performed to burn the particulate matter which has collected in the filter 41. In this process, the engine controller 31:

(1) determines whether or not the engine 1 is rapidly decelerating during regeneration, (2) if the engine 1 is rapidly decelerating during regeneration, sets a second target exhaust gas temperature lower than a first target exhaust gas temperature, and (3) controls the exhaust gas temperature to the second target exhaust gas temperature while increasing the exhaust gas flow rate.

Figure 2:
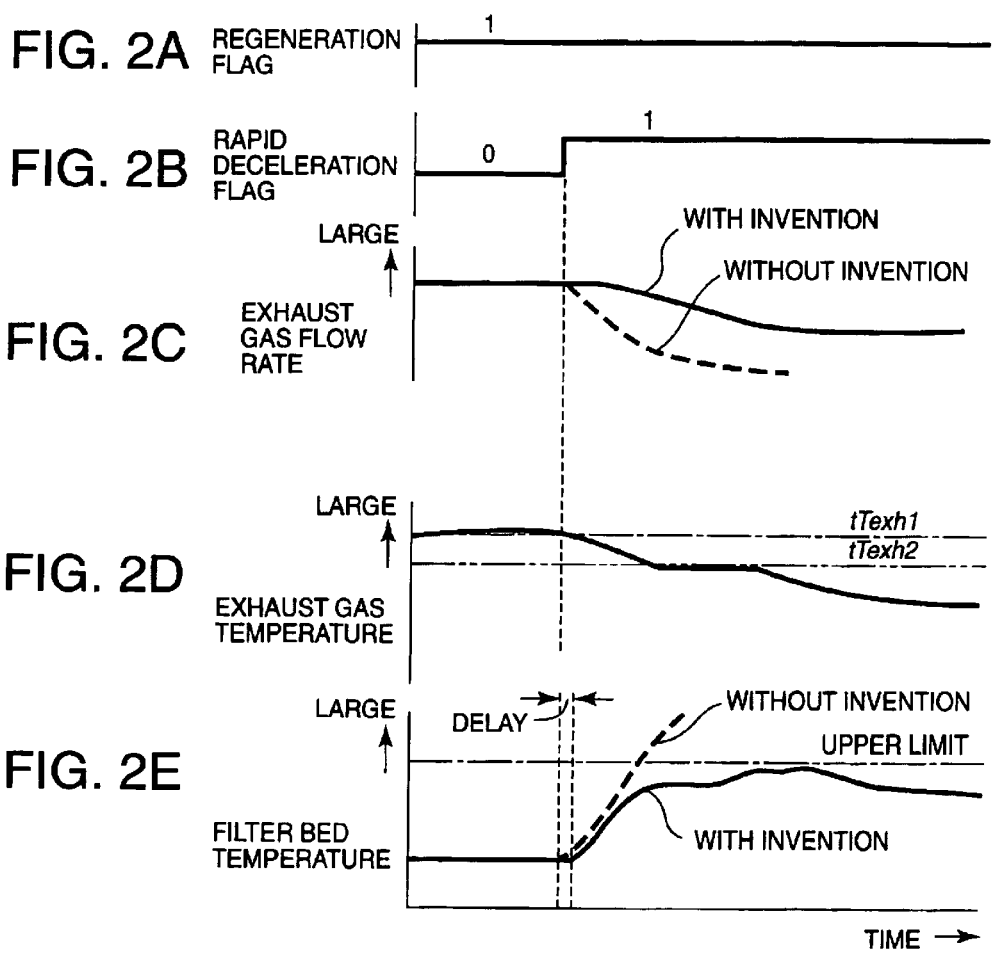
FIGS. 2A–2E are timing charts describing the effect of the control according to this invention.

Referring to FIGS. 2A–2E, if the accelerator pedal is released and the engine 1 decelerates rapidly during regeneration of the filter 41, the exhaust gas flow rate first rapidly decreases as shown by the dotted line in FIG. 2C. The exhaust gas flowing into the filter 41 during regeneration has the function of supplying the oxygen required for the combustion of particulate matter and discharging excess heat in the filter 41 into the atmosphere. If the exhaust gas flow rate rapidly decreases during regeneration of the filter 41, the excess heat discharge function declines, and if particulate matter continues to be burnt, the bed temperature of the filter 41 rapidly rises so that it may exceed an upper limiting temperature as shown by the dotted line in FIG. 2E.

The above description refers to what happens when the engine 1 rapidly decelerates during regeneration of the filter 41, and an identical phenomenon occurs when regeneration of the filter 41 is performed while the engine 1 is rapidly decelerating.

The engine controller 31, to prevent a rapid rise of the bed temperature of the filter 41, firstly avoids performing regeneration of the filter 41 during deceleration of the engine 1.

Also, if the engine 1 is rapidly decelerating during regeneration of the filter 41, the exhaust gas flow rate is corrected in the increase direction as shown by the solid line in FIG. 2C, and the target exhaust gas temperature is changed over to a second target temperature tTexh2 lower than a first target temperature tTexh1 to regenerate the filter 41 as shown in FIG. 2D. Due to these measures, the bed temperature of the filter 41 is prevented from exceeding the upper limiting temperature as shown by FIG. 2E.

The control performed by the engine controller 31 will now be described referring to the flowcharts of FIGS. 3–5, 7 and 11. The routines shown in these figures are mutually independent, and the engine controller 31 executes the routines at intervals of ten milliseconds during the running of the engine 1.

Figure 3:
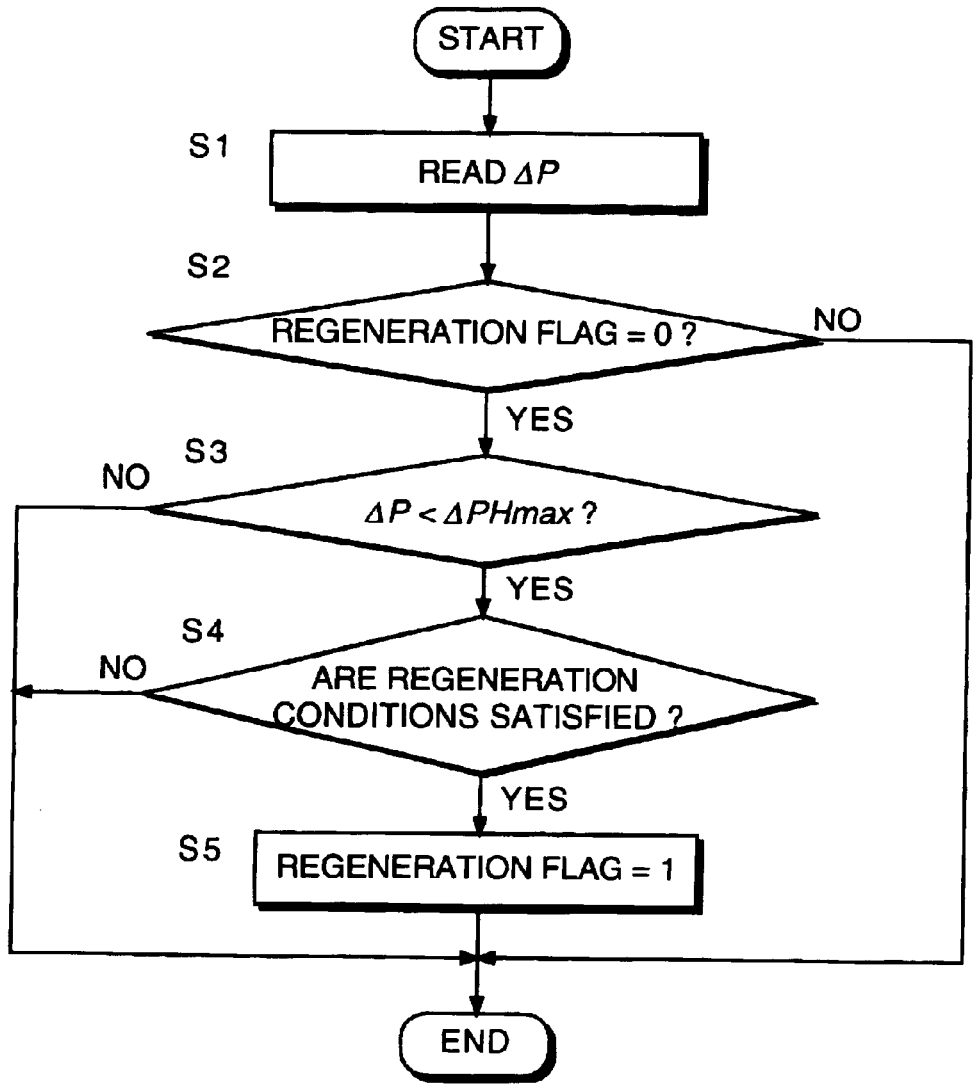
FIG. 3 is a flowchart describing a routine for setting a regeneration flag executed by an engine controller according to this invention.

In a regeneration flag setting routine shown in FIG. 3, the engine controller 31, in a step S1, first reads the differential pressure $\Delta P$ upstream and downstream of the particulate filter 41 detected by the differential pressure sensor 36. The differential pressure $\Delta P$ corresponds to the pressure loss of the exhaust gas which has passed through the diesel particulate filter 41.

In a next step S2, the engine controller 31 determines whether or not the regeneration flag is zero. The regeneration flag is a flag which is set to unity when regeneration conditions are satisfied, and its initial value is zero. The regeneration conditions will be described later.

In the step S2, when the regeneration flag is zero, the engine controller 31 immediately terminates the routine. When the regeneration flag is not zero, i.e., when it is unity, the engine controller 31, in a step S3, determines whether or not the differential pressure $\Delta P$ exceeds the regeneration start determining value $\Delta PHmax$.

When the differential pressure $\Delta P$ exceeds the regeneration start determining value $\Delta PHmax$, regeneration of the filter 41 is required, and in this case, the engine controller 31, in a step S4, determines whether or not regeneration conditions are satisfied.

The regeneration conditions are conditions which determine whether or not the running conditions of the engine 1 are suitable for regeneration of the filter 41. Herein, the regeneration conditions will be taken to be whether the engine rotation speed Ne and the fuel injection amount corresponding to the engine load are within predetermined ranges. The region corresponding to idle running of the engine 1 or the adjacent low load region are excluded from the predetermined range. This is because, during idle running or in the low load region, the exhaust gas temperature is low, and even if a post-injection is performed and the opening of the intellectual 42 is narrowed in order to increase the exhaust gas temperature, the bed temperature of the filter 41 can hardly be raised to a first target bed temperature tTbed1 during regeneration.

Herein, the first target bed temperature tTbed1 is a temperature at which the particulate matter collected in the filter 41 rapidly burns due to self-ignition, and it is a value within the range of 450 degrees centigrade–650 degrees centigrade.

Even when the engine rotation speed Ne and fuel injection amount are within the predetermined ranges, if the engine 1 is decelerating, it is determined that regeneration conditions are not satisfied.

If the regeneration conditions are satisfied in the step S4, the engine controller 31, in a step S5, sets the regeneration flag to unity. After the processing of the step S5, the engine controller 31 terminates the routine. When the differential pressure $\Delta P$ does not exceed the regeneration start determining value $\Delta PHmax$ in the step S3, or when the regeneration conditions are not satisfied in the step S4, the engine controller 31 immediately terminates the routine.

Due to the above regeneration flag setting routine, once the regeneration flag has been set to unity, when the routine is next executed, the determination result of the step S2 is negative, and the engine controller 31 immediately terminates the routine. In other words, the regeneration flag setting routine is performed only to set the regeneration flag, not to reset it. The resetting of the regeneration flag is performed by the routine of FIG. 5.

Figure 4:
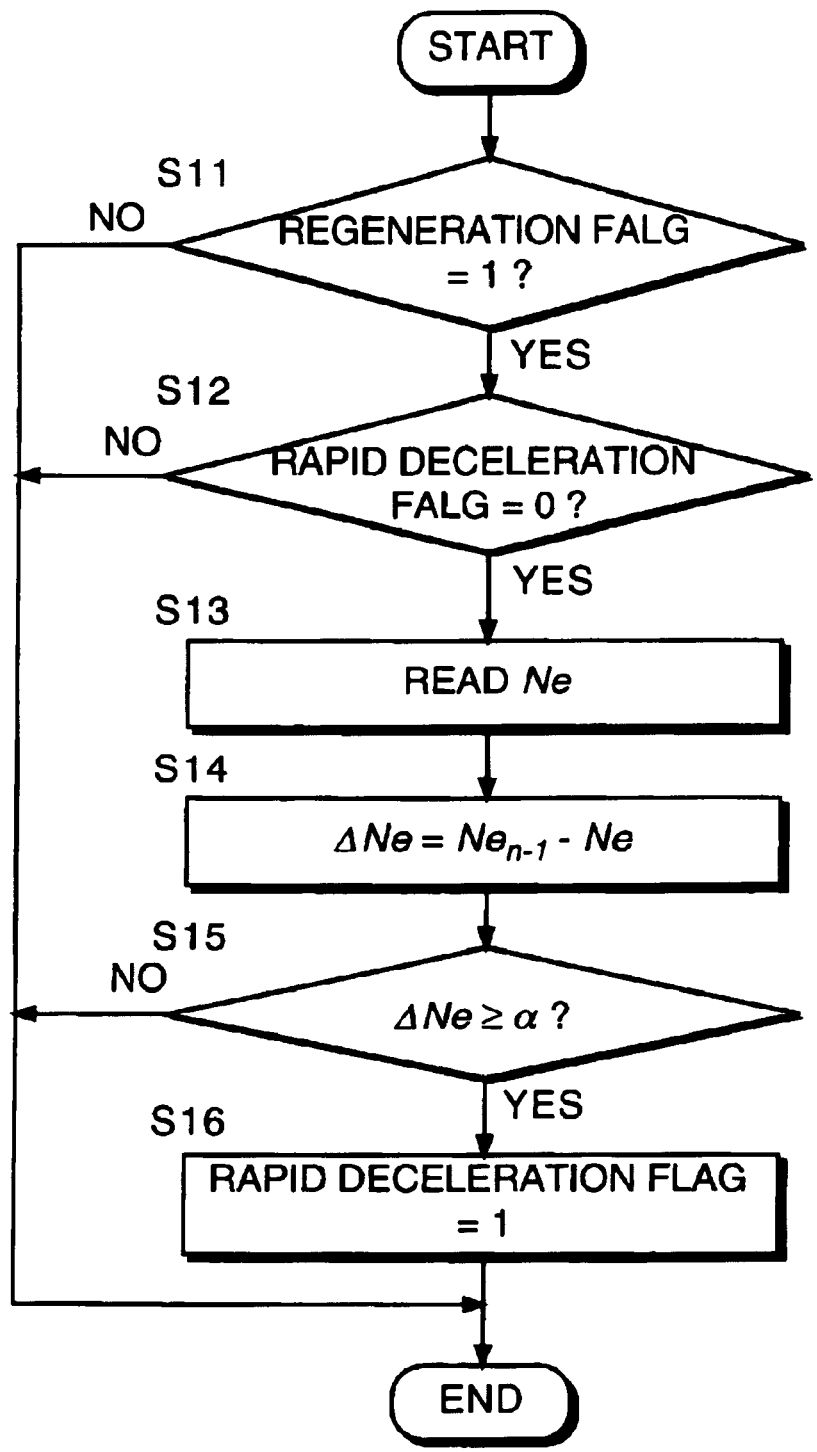
FIG. 4 is a flowchart describing a routine for setting a rapid deceleration flag executed by the engine controller.

In a rapid deceleration flag setting routine shown in FIG. 4, the engine controller 31, first in a step S11, determines whether or not the regeneration flag is unity. The regeneration flag determined herein is the regeneration flag set by the regeneration flag setting routine executed immediately prior to the rapid deceleration flag setting routine.

When the regeneration flag is unity, in a step S12, the engine controller 31 determines whether or not the rapid deceleration flag is zero. The rapid deceleration flag is a flag which shows whether the engine 1 is rapidly decelerating, and its initial value is zero. When the rapid deceleration flag is zero, the engine controller 31, in a step S13, reads the engine rotation speed Ne detected by the crank angle sensor 33.

In a next step S14, the engine controller 31 calculates a difference $\Delta Ne$ between the engine rotation speed $Ne_{n-1}$ read on the immediately preceding occasion the routine was executed, and the engine rotation speed Ne read on the present occasion. When the difference $\Delta Ne$ is a positive value, the engine 1 is decelerating, and when the difference $\Delta Ne$ is a negative value, the engine 1 is accelerating. When the difference $\Delta Ne$ is zero, it means that the engine 1 is in a steady running state.

In a next step S15, the engine controller 31 determines whether or not the difference $\Delta Ne$ is equal to or more than a predetermined positive threshold value alpha. When the difference $\Delta Ne$ is equal to or more than the threshold value alpha, it is considered that the engine 1 is rapidly decelerating. In this case, the engine controller 31, in a step S16, sets the rapid deceleration flag to unity. After the processing of the step S16, the engine controller 31 terminates the routine.

When the regeneration flag is not unity in the step S11, the rapid deceleration flag is not zero in the step S12 or the difference $\Delta Ne$ is less than the threshold value alpha in the step S15, the engine controller 31 immediately terminates the routine. As a result, even if the engine 1 is decelerating, provided that it is not rapidly decelerating, the rapid deceleration flag is not set to unity. This is because, during gradual deceleration, the bed temperature rise of the filter 41 due to decrease of exhaust gas flow rate is also gradual, and it does not exceed the upper limiting temperature. The threshold value alpha corresponds to a deceleration state where the bed temperature becomes equal to the upper limiting temperature. The threshold value alpha is set experimentally.

In the above rapid deceleration flag setting routine, once the rapid deceleration flag is set to unity, the determination result of the step S12 on the next occasion the routine is executed is negative, so the engine controller 31 immediately terminates the routine. In other words, the rapid deceleration flag setting routine only sets the rapid deceleration flag, and does not reset it. The resetting of the regeneration flag is performed by the routine of FIG. 5 described later.

Figure 5:
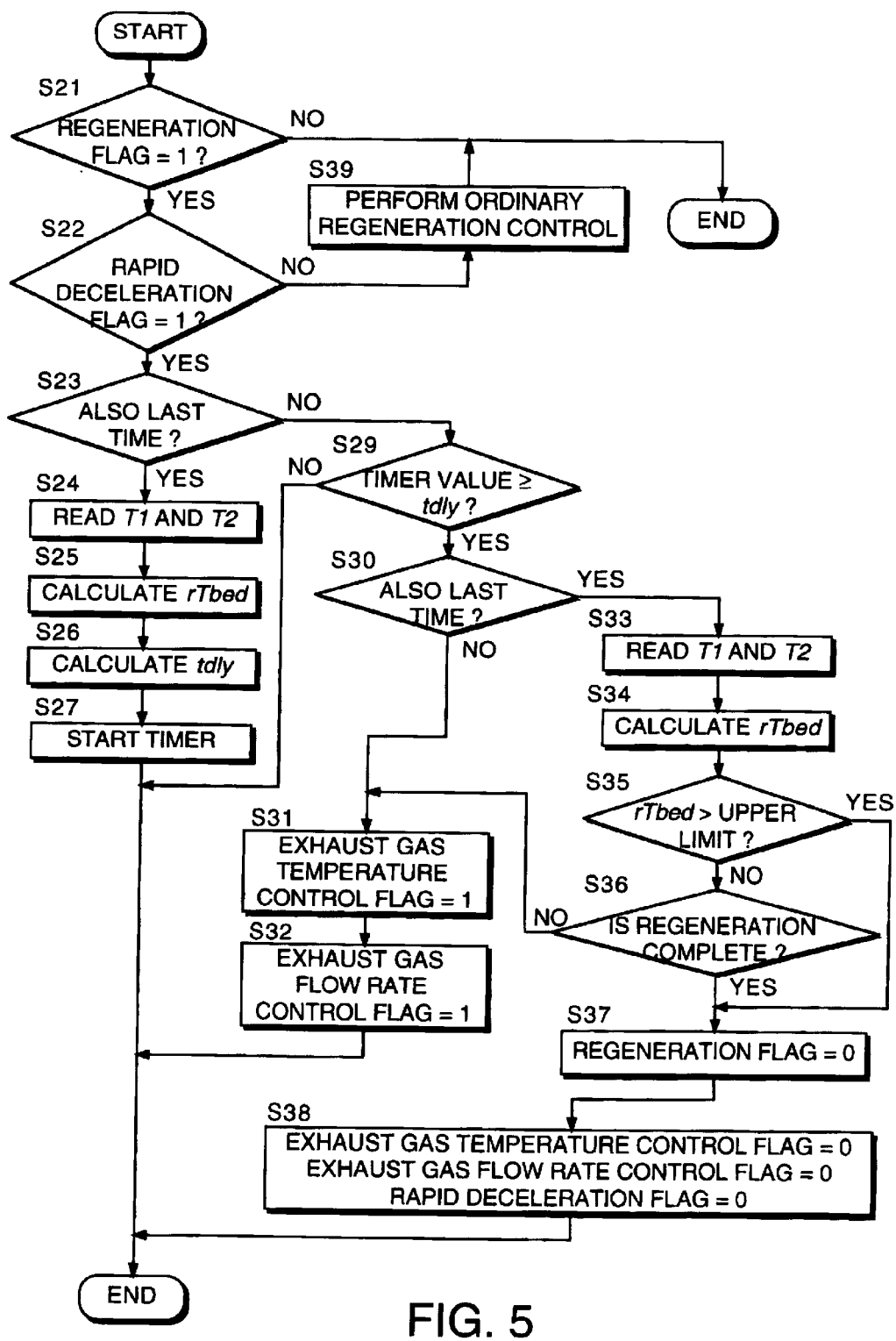
FIG. 5 is a flowchart describing a routine for regeneration of a filter executed by the engine controller.

In a filter regeneration routine shown in FIG. 5, the engine controller 31, in a step S21, first determines whether or not the regeneration flag is unity. When the regeneration flag is not unity, the regeneration of the filter 41 is not required. In this case, the engine controller 31 immediately terminates the routine.

When the regeneration flag is unity, the engine controller 31, in a step S22, determines whether or not the rapid deceleration flag is unity. When the rapid deceleration flag is not unity, regeneration of the filter 41 is required but rapid deceleration control is not required. In this case, the engine controller 31 performs ordinary regeneration of the filter 41 in a step S39, i.e., controlling the exhaust gas temperature based on the first target temperature tTexh1, and it terminates the routine.

When the rapid deceleration flag is unity in the step S22, it shows that the engine 1 is rapidly decelerating during regeneration of the filter 41.

In this case, the engine controller 31, in a step S23, determines whether or not the rapid deceleration flag was zero on the immediately preceding occasion the routine was executed. In other words, it determines whether or not the rapid deceleration flag changed to unity for the first time in the present execution of the routine. When the determination result of the step S23 is positive, i.e., when the rapid deceleration flag became unity for the first time on this occasion, the engine controller 31 performs the processing of steps S24–S27.

In the step S24, the engine controller 31 reads the inlet temperature T1 of the filter 41 detected by the temperature sensor 37, and the outlet temperature T2 of the filter 41 detected by the temperature sensor 38.

In the next step S25, the real bed temperature rTbed of the filter 41 is calculated by the following equation (1):

$$rTbed = b1 \cdot T1 + b2 \cdot T2 \tag{1}$$

where, b2, b2=experimentally determined constants.

Figure 6:
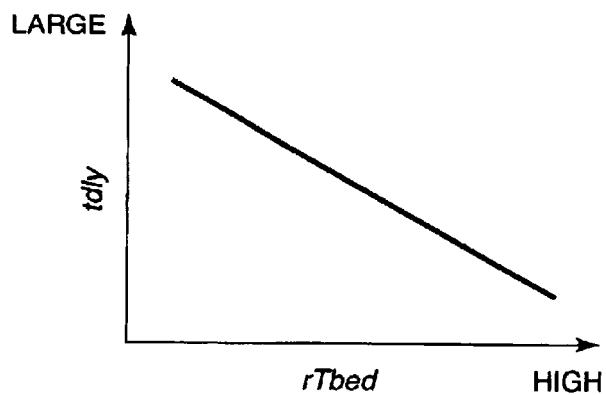
FIG. 6 is a diagram describing the characteristics of a map of a delay time tdly stored by the engine controller.

In the next step S26, the engine controller 31 calculates a delay time tdly by looking up a map having the characteristics shown in FIG. 6 based on the real bed temperature rTbed. This map is prestored in a memory (ROM) of the engine controller 31. The delay time tdly is the operating delay time when the target exhaust gas temperature changes over from the first target temperature tTexh1 to the lower second target temperature tTexh2.

Referring to FIG. 6, the delay time tdly is set to be longer, the lower is the real bed temperature rTbed. When the real bed temperature rTbed is low, it is preferred to set the delay time tdly to be longer to avoid increase of bed temperature. On the other hand, when the real bed temperature rTbed is high, the delay time tdly must be set very short to prevent the upper limiting value of the bed temperature from being exceeded. The delay time tdly is set to satisfy these requirements.

In the next step S27, a timer is started. This timer is a timer which measures the elapsed time from when the rapid deceleration flag became unity. After the processing of the step S27, the engine controller 31 terminates the routine.

In the routine executed after the processing of the steps S24–S27, the determination result of the step S23 is negative. In this case, the engine controller 31, in a step S29, determines whether or not the timer value has reached the delay time tdly. When the timer value has not reached the delay time tdly, the engine controller 31 immediately terminates the routine. Therefore, after the processing of the steps S24–S27, insofar as concerns this routine, the engine controller 31 waits without performing any processing until the timer value reaches the delay time tdly.

When the timer value reaches the delay time in the step S29, the engine controller 31, in a step S30, determines whether or not the immediately preceding timer value reached the delay time tdly. In other words, in determines whether the timer value reached the delay time tdly for the first time on the present occasion when the routine was executed.

If it is determined that the immediately preceding timer value did not reach the delay time tdly, the engine controller 31, in a step S31, sets an exhaust gas temperature control flag to unity, and in a next step S32, sets an exhaust gas flow rate control flag to unity. The initial values of the exhaust gas temperature control flag and exhaust gas flow rate control flag are both zero. After these flags are set to unity, the engine controller 31 terminates the routine.

The exhaust gas temperature control flag is a flag for executing an exhaust gas temperature control routine, and the exhaust gas flow rate control flag is a flag for executing an exhaust gas flow rate control routine.

When it is determined that the immediately preceding timer value reached the delay time tdly in the step S30, the engine controller 31, in a step S33, reads the inlet temperature T1 and outlet temperature T2 of the filter 41.

In a next step S34, the engine controller 31 calculates the real bed temperature rTbed by equation (1) in the same way as in the aforesaid step S25.

In a next step S35, the engine controller 31 determines whether or not the real bed temperature rTbed exceeds the upper limiting temperature. At this stage, the exhaust gas temperature control flag and exhaust gas flow rate control flag are both unity, and exhaust gas temperature control and exhaust gas flow rate control are performed to prevent rapid rise of the bed temperature of the filter 41. In this state, if the real bed temperature rTbed exceeds the upper limiting temperature, it means that these controls are not functioning effectively. In this case, the engine controller 31, in a step S37, resets the regeneration flag to zero, and in a next step S38, after resetting both the exhaust gas temperature control flag and exhaust gas flow rate control flag to zero, the routine is terminated. The resetting of the regeneration flag to zero means that regeneration of the filter 41 is to be terminated. In other words, when the real bed temperature rTbed exceeds the upper limiting temperature, the regeneration of the filter 41 is immediately stopped.

When the real bed temperature rTbed does not exceed the upper limiting temperature in the step S35, the engine controller 31, in a step S36, determines whether or not regeneration of the filter 41 is complete. This determination is performed by determining whether or not an elapsed time from when filter regeneration started, reached a predetermined time. Various other methods are known in the art for determining whether or not regeneration of the filter 41 is complete. Therefore, the determination of whether the regeneration of the filter 41 is complete, may be performed also by another method.

When it is determined that the regeneration of the filter 41 is complete in the step S36, the engine controller 31 terminates the routine after performing the aforesaid steps S37 and S38. When it is determined that regeneration of the filter 41 is not complete, the engine controller 31 terminates the routine after performing the aforesaid steps S31 and S32.

Figure 7:
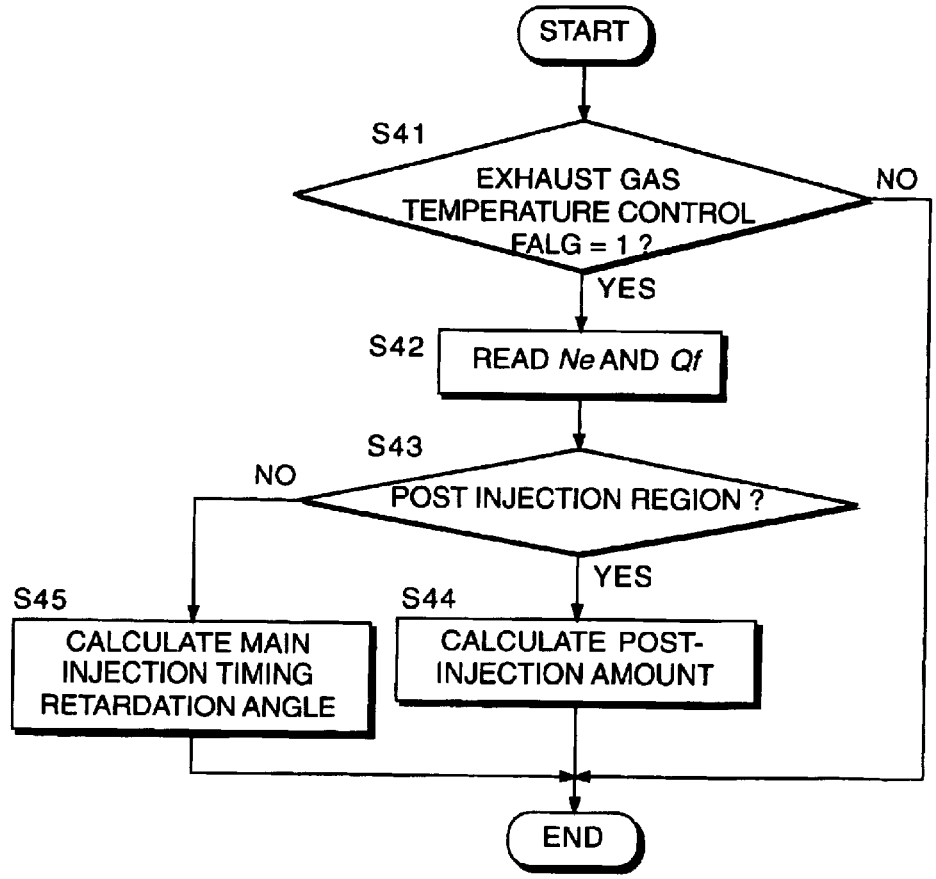
FIG. 7 is a flowchart describing an exhaust gas temperature control routine executed by the engine controller.

In an exhaust gas temperature control routine shown in FIG. 7, the engine controller 31, in a step S41, determines whether or not the exhaust gas temperature control flag is unity. When the exhaust gas temperature control flag is not unity, the engine controller immediately terminates the routine. This exhaust gas temperature control routine is therefore effectively executed only when the exhaust gas temperature control flag is unity.

When the exhaust gas temperature control flag is unity in the step S41, the engine controller 31 reads the engine rotation speed Ne and fuel injection amount Qf in a step S42. As described above, the fuel injection amount Qf depends on a duty signal output by the engine controller 31 to the nozzle 17. Therefore, the fuel injection amount Qf is a known value to the engine controller 31.

In a next step S43, the engine controller 31 determines whether or not the running condition of the engine 1 determined by the engine rotation speed Ne and fuel injection amount Qf is within a post-injection region. Herein, the fuel injection amount Qf is used as a value representative of the load of the engine 1.

Figure 8:
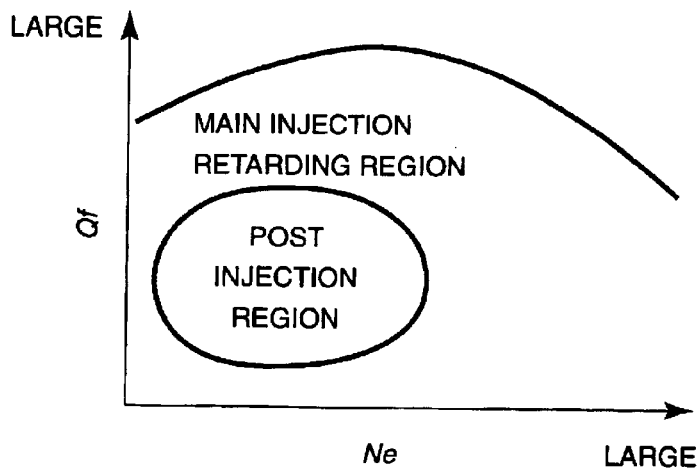
FIG. 8 is a diagram describing the characteristics of a map of an injection region stored by the engine controller.

This determination is performed by looking up a map having the characteristics shown in FIG. 8 prestored in a memory (ROM) of the engine controller 31. In this map, the post-injection region and retardation region of the main injection timing are set. Post-injection means a supplementary fuel injection after the main injection to rotate the engine 1. The retardation of the main injection timing also raises the exhaust gas temperature by delaying the timing of the main injection. In the step S43, which of these methods is used to raise the exhaust gas temperature is determined according to the engine rotation speed Ne and fuel injection amount Qf.

Figure 9:
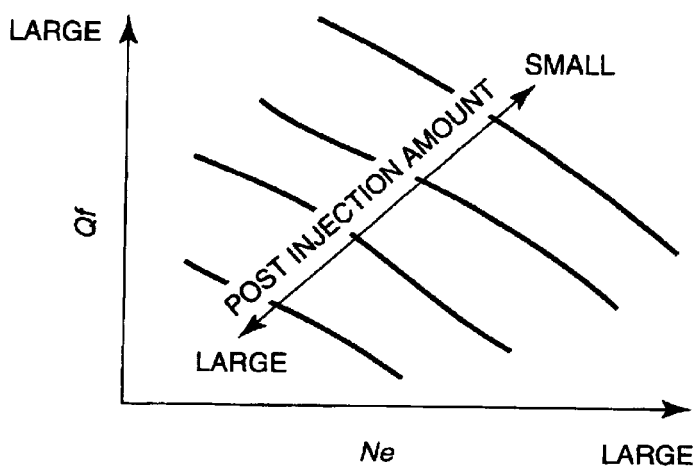
FIG. 9 is a diagram describing the characteristics of a map of a post-injection amount stored by the engine controller.

In the step S43, when it is determined that the running condition of the engine 1 is within the post-injection region, the engine controller 31, in a step S44, calculates a post-injection amount from the engine rotation speed Ne and fuel injection amount Qf by looking up a map having the characteristics shown in FIG. 9 prestored in a memory (ROM) of the engine controller 31. Under different running conditions, this map specifies the post-injection amount for controlling the exhaust gas temperature to the second target temperature tTexh2. In this map, the post-injection amount is set to be larger, the smaller is the fuel injection amount Qf of the main injection and the smaller is the engine rotation speed Ne.

Figure 10:
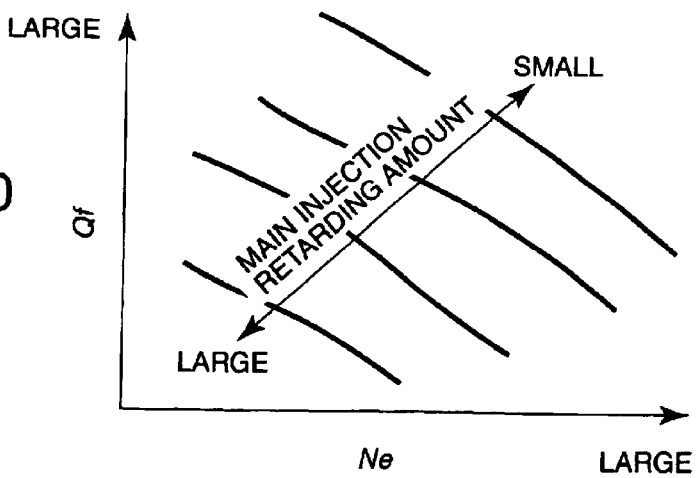
FIG. 10 is a diagram describing the characteristics of a map of a main injection timing retardation amount stored by the engine controller.

In the step S43, when it is determined that the running condition of the engine 1 is not in the post-injection region, the engine controller 31, in a step S45, calculates the retardation angle of the main injection timing from the engine rotation speed Ne and fuel injection amount Qf by looking up a map having the characteristics shown in FIG. 10 prestored in the memory (ROM) of the engine controller 31. Under different running conditions, this map specifies the retardation angle of the main fuel injection timing to control the exhaust gas temperature to the second target temperature tTexh2. The retardation angle in this map is set to be larger, the smaller is the fuel injection amount Qf of the main injection and the smaller is the engine rotation speed Ne.

The post-injection amount set in the step S45 and retardation angle of the main injection timing set in the step S44 are used for a fuel injection control routine which exists as a separate routine, and are implemented by executing the fuel injection control routine.

Figure 11:
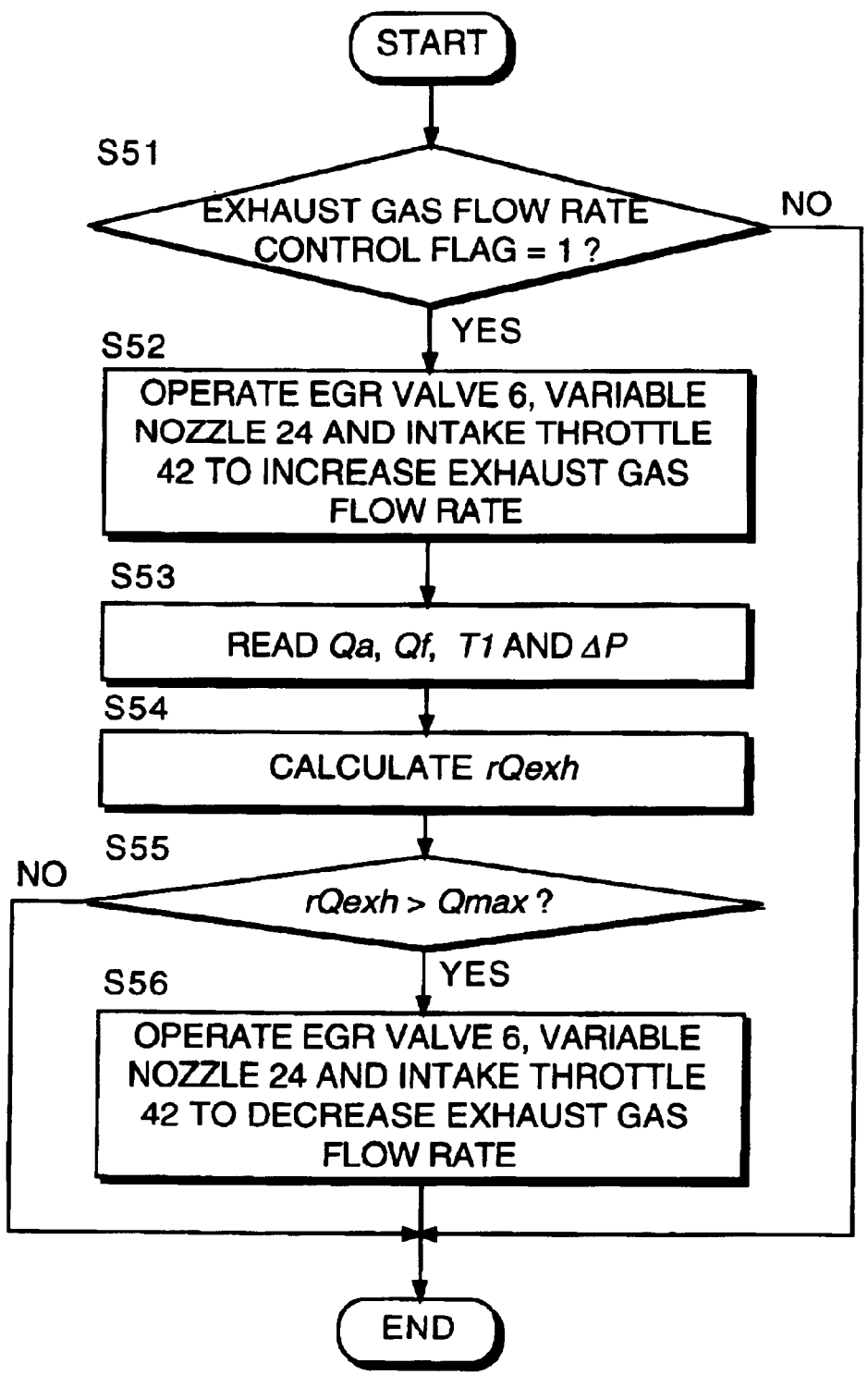
FIG. 11 is a flowchart describing an exhaust gas flow rate control routine stored by the engine controller.

In an exhaust gas flow rate control routine shown in FIG. 11, the engine controller 31, in a step S51, determines whether or not the exhaust gas flow rate control flag is unity. When the exhaust gas flow rate control flag is not unity, the engine controller 31 immediately terminates the routine. The exhaust gas flow rate control flag is a flag set by the aforesaid routine of FIG. 5.

When the exhaust gas flow rate control flag is unity, the engine controller 31, in a step S52, controls the opening of the EGR valve 6, the opening of the variable nozzle 24 and the opening of the air intake throttle 42 so that the exhaust gas flow rate increases.

Figure 12:
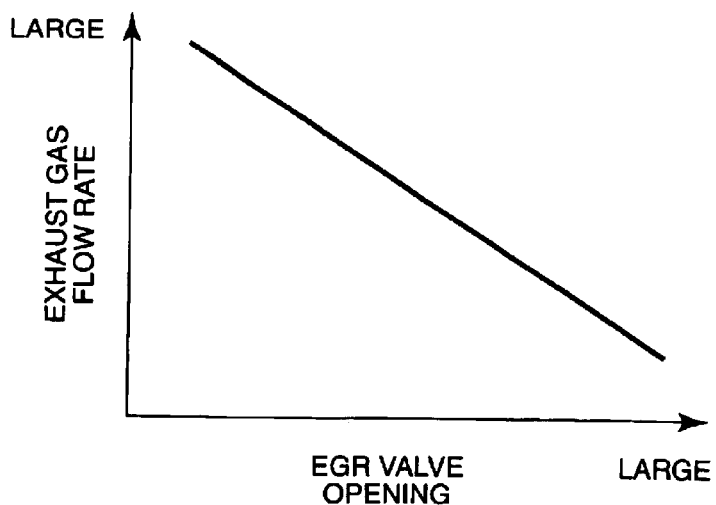
FIG. 12 is a diagram describing a relation between an EGR valve opening and the exhaust gas flow rate.
Figure 13:
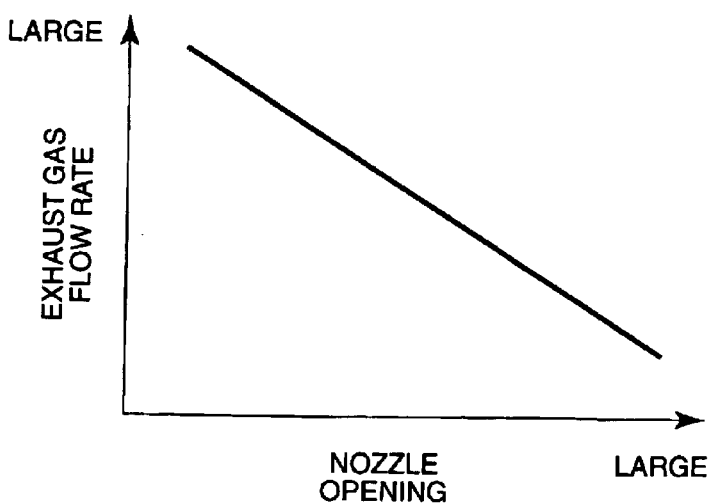
FIG. 13 is a diagram describing the relation between a variable nozzle opening and the exhaust gas flow rate.
Figure 14:
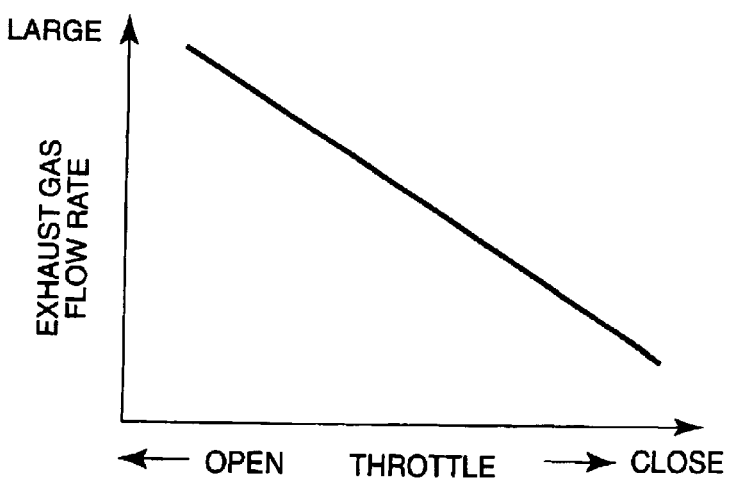
FIG. 14 is a diagram describing the relation between an air intake throttle opening and the exhaust gas flow rate.

Referring to FIG. 12, the exhaust gas flow rate increases as the opening of the EGR valve 6 decreases. Referring to FIG. 13, the exhaust gas flow rate increases as the opening of the variable nozzle 24 decreases. Referring to FIG. 14, the exhaust gas flow rate increases as the opening of the air intake throttle 42 increases.

Figure 15:
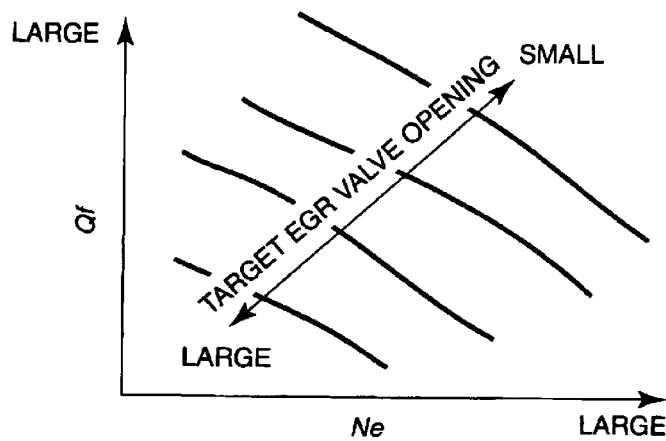
FIG. 15 is a diagram describing the characteristics of a map of a target EGR valve opening stored by the engine controller.
Figure 16:
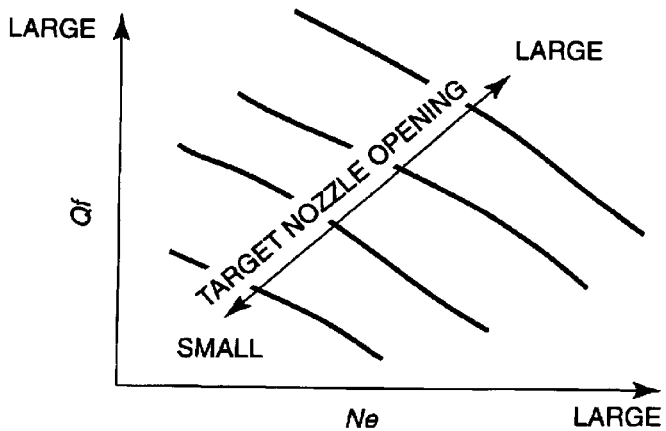
FIG. 16 is a diagram describing the characteristics of a map of a target variable nozzle opening stored by the engine controller.
Figure 17:
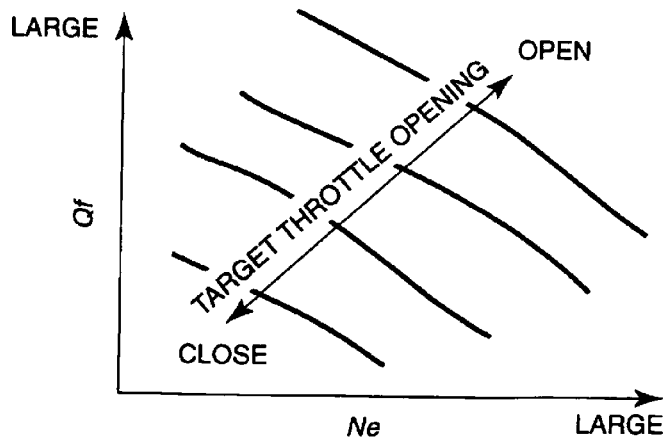
FIG. 17 is a diagram describing the characteristics of a map of a target air intake throttle opening stored by the engine controller.

Maps of the target EGR valve opening, target variable nozzle opening and target air intake throttle opening having the characteristics shown in FIGS. 15–17 are prestored in the engine controller 31. The maps of FIGS. 15 and 16 are set to have characteristics to give respectively smaller values than a target EGR valve opening and target nozzle opening set when the exhaust gas flow rate control flag is not unity for an identical engine rotation speed Ne and main fuel injection amount Qf.

On the other hand, the map of FIG. 17 is set to have characteristics to give a larger value than a target throttle opening set when the exhaust gas flow rate control flag is not unity for an identical engine rotation speed Ne and main fuel injection amount Qf.

The engine controller 31, in a step S52, determines the target EGR valve opening, target variable nozzle opening and target air intake throttle opening by looking up these maps from the engine rotation speed Ne and fuel injection amount Qf. The opening of the EGR valve 6, opening of the variable nozzle 24 and opening of the air intake throttle 42 are then respectively controlled to the target values.

In this embodiment, the exhaust gas flow rate is increased by operating the EGR valve 6, variable nozzle 24 and air intake throttle 42, but the increase of exhaust gas flow rate can be obtained by operating at least one of the EGR valve 6, variable nozzle 24 and air intake throttle 42.

In a next step S53, the engine controller 31 reads an intake air flow rate Qa detected by the air flow meter 35, the fuel injection amount Qf, inlet temperature T1 of the filter 41 and the differential pressure ΔP upstream and downstream of the diesel particulate filter 41.

In a next step S54, a real exhaust gas flow rate rQexh is calculated by the following equation (2):

$$rQexh = A \cdot (Qa + \sigma 2 \cdot \sigma 1 \cdot Qf) \cdot \left( \frac{P0}{273 + 20} \cdot \frac{273 + T1}{P0 + \Delta P} \right) \quad (2)$$

where,

A=constant,

σ1=fuel density (constant value)m,

σ2=exhaust gas density (constant value),

P0=atmospheric pressure, and $$\left(\frac{P0}{273+20} \cdot \frac{273+Tl}{P0+\Delta P}\right) = \text{conversion coefficient to the basic state of twenty degrees centigrade, atmospheric pressure.}$$

Figure 18:
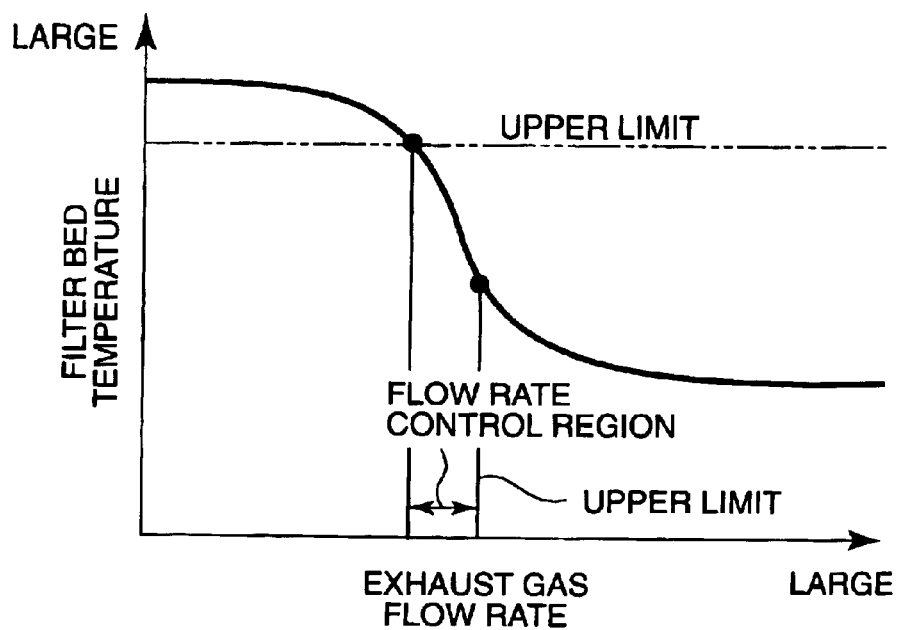
FIG. 18 is a diagram describing the relation of the exhaust gas flow rate and the filter bed temperature.

In a next step S55, the engine controller 31 compares the real exhaust gas flow rate rQexh with an upper limiting value Qmax. The upper limiting value is set based on the relation between the exhaust gas flow rate and the bed temperature during filter regeneration as shown in FIG. 18. As shown in this diagram, if the exhaust gas flow rate is increased too much, the bed temperature of the filter 41 decreases more than necessary. Therefore, the upper limit Qmax is set to limit the exhaust gas flow rate. If the exhaust gas flow rate corresponding to the upper limiting bed temperature is taken as a lower limiting value, the exhaust gas flow rate is preferably regulated within the range from the lower limiting value to the upper limiting value Qmax.

In the step S55, if the real exhaust gas flow rate rQexh does not exceed the upper limiting value Qmax, the engine controller 31 terminates the routine. In the step S55, if the real exhaust gas flow rate rQexh exceeds the upper limiting value Qmax, the engine controller 31, in a step S56, corrects the target EGR valve opening and target variable nozzle opening in the increasing direction, corrects the target air intake throttle opening in the decreasing direction, and controls the opening of the EGR valve 6, opening of the variable nozzle 24 and opening of the air intake throttle 42 according to the corrected target values.

The correction values at this time are determined as follows.

Figure 19:
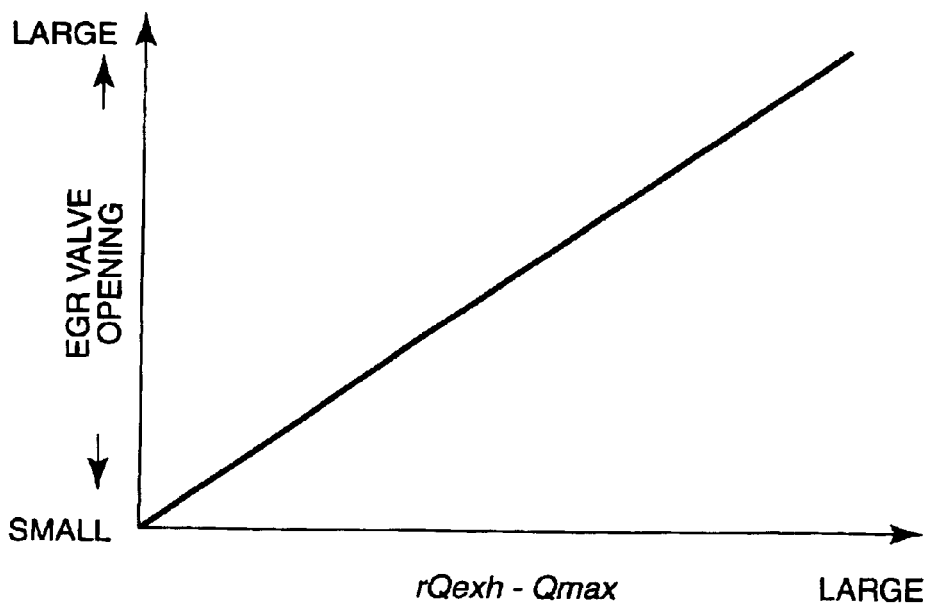
FIG. 19 is a diagram describing the characteristics of a map of an EGR valve opening correction amount stored by the controller.
Figure 20:
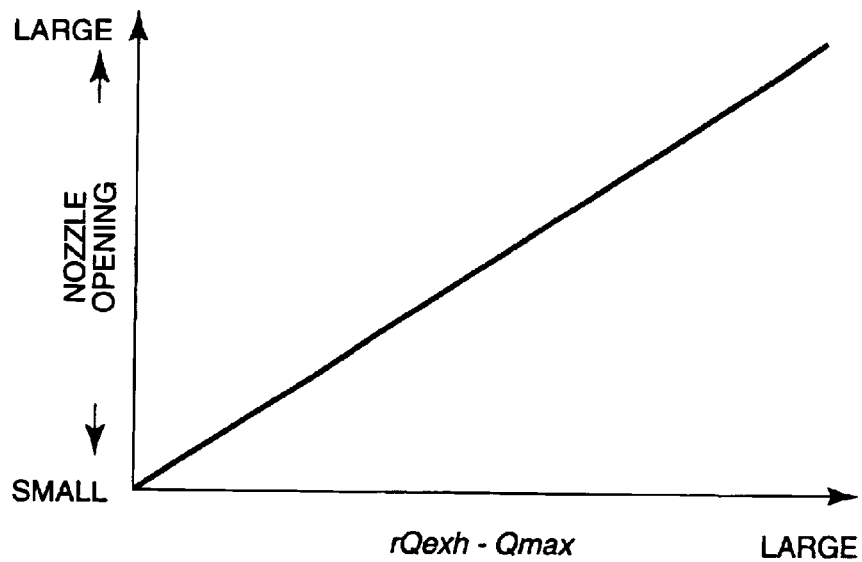
FIG. 20 is a diagram describing the characteristics of a map of a variable nozzle opening correction amount stored by the controller.
Figure 21:
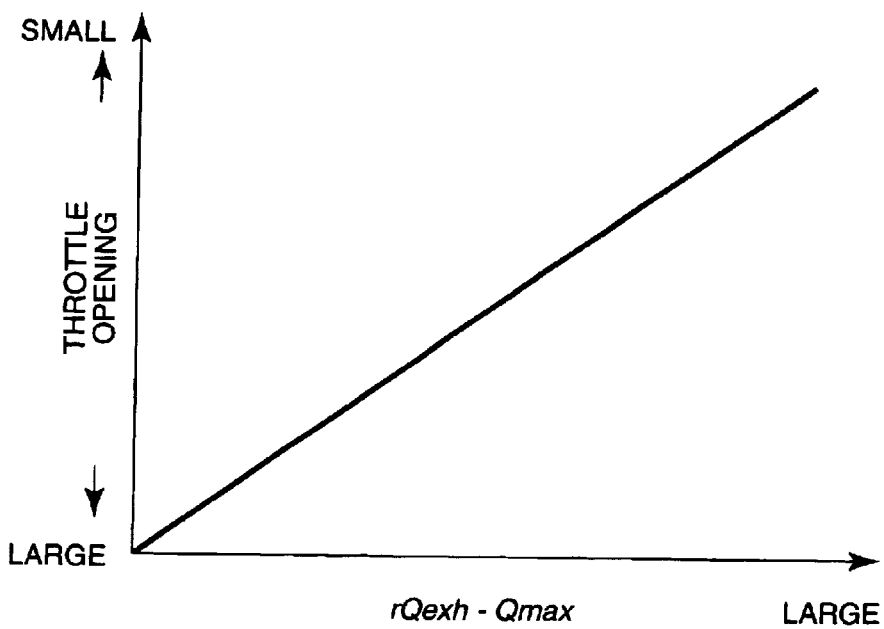
FIG. 21 is a diagram describing the characteristics of a map of an intake throttle opening correction amount stored by the controller.

Firstly, a difference rQexh−Qmax between the real exhaust gas flow rate rQexh and the upper limiting value Qmax is calculated. The correction values of the opening of the EGR valve 6, opening of the variable nozzle 24 and opening of the air intake throttle 42 are then determined by looking up a map having the characteristics shown in FIGS. 19–21 prestored in a memory (ROM) of the engine controller 31 based on the difference rQexh−Qmax.

The maps of FIGS. 15–17 used to increase the exhaust gas flow rate in the step S52 are all set so that the exhaust gas flow rate remains below the upper limiting value Qmax. However, even when the maps of FIGS. 15–17 are applied, it may occur that the exhaust gas flow rate exceeds the upper limiting value Qmax for some reason. The steps S55 and S56 are provided to ensure that the real exhaust gas flow rate rQexh does not exceed the upper limiting value Qmax.

Due to the above control performed by the engine controller 31, if the engine 1 decelerates during regeneration of the filter 41, the exhaust gas target temperature is changed over from the first target temperature to the second target temperature which is lower than the first target temperature, and the exhaust gas flow rate increases. As a result, a rapid exhaust gas temperature rise is suppressed, and discharge of excess heat from the filter 41 by the exhaust gas is maintained. Therefore, a rapid bed temperature rise of the filter 41 due to rapid deceleration of the engine 1 is suppressed while regeneration of the filter 41 can be continued. Further, even when the engine 1 has rapidly decelerated during regeneration of the filter 41, regeneration of the filter 41 is not interrupted, so the opportunities for regenerating the filter 41 are increased.

The engine controller 31 re-adjusts the opening of the EGR valve 6, opening of the variable nozzle 24 and opening of the air intake throttle 42 so that the increased exhaust gas flow rate does not exceed the upper limiting value Qmax, so the bed temperature of the filter 41 is maintained within a suitable temperature region even if the exhaust gas flow rate is increased, and regeneration of the filter 41 is not interrupted.

Moreover, during deceleration, the engine controller 31 does not start regeneration, so there is less possibility that the bed temperature of the filter 41 will rise rapidly during regeneration.

The contents of Tokugan 2002-347394, with a filing date of Nov. 29, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A regeneration device for a filter which traps a particulate matter contained in the exhaust gas of an engine, the device regenerating the filter by burning the particulate matter trapped in the filter by raising a temperature of the filter, the device comprising:
   an exhaust gas temperature adjusting mechanism which adjusts a temperature of the exhaust gas;
   an exhaust gas flow rate adjusting mechanism which adjusts a flow rate of the exhaust gas; and
   a programmable controller programmed to:
      determine whether or not a regeneration condition for the filter is satisfied;
      raise the temperature of the exhaust gas to a first target exhaust gas temperature via the exhaust gas temperature adjusting mechanism when the regeneration condition is satisfied;
      determine whether or not the engine is in a predetermined rapid deceleration state; and
      control the temperature of the exhaust gas to a second target exhaust gas temperature lower than the first target exhaust gas temperature via the exhaust gas temperature adjusting mechanism while increasing the flow rate of the exhaust gas via the exhaust gas flow rate adjusting mechanism, when the engine is in the predetermined rapid deceleration state during regeneration.

2. The regeneration device as defined in claim 1, wherein the controller is further programmed to control the exhaust gas flow rate adjusting mechanism to prevent the flow rate of the exhaust gas from exceeding a predetermined upper limiting value.

3. The regeneration device as defined in claim 1, wherein the exhaust gas temperature adjusting mechanism comprises a nozzle which injects fuel to the engine, and the controller is further programmed to control the temperature of the exhaust gas to the second target exhaust gas temperature by retarding an injection timing of the nozzle.

4. The regeneration device as defined in claim 1, wherein the exhaust gas temperature adjusting mechanism comprises a nozzle which injects fuel into the engine, and the controller is further programmed to control the temperature of the exhaust gas to a second target exhaust gas temperature by performing a post-injection after an ordinary injection by the nozzle.

5. The regeneration device as defined in claim 1, wherein the exhaust gas flow rate adjusting mechanism comprises an air intake throttle which adjusts an intake air flow rate of the engine.

6. The regeneration device as defined in claim 1, wherein the engine comprises a turbocharger which turbocharges an intake air of the engine, the turbocharger comprising an exhaust gas turbine which rotates due to an energy of the exhaust gas and a compressor which turbocharges the intake air according to a rotation of the exhaust gas turbine, and the exhaust gas flow rate adjusting mechanism comprises a variable nozzle which varies an exhaust gas flow rate inside the exhaust gas turbine.

7. The regeneration device as defined in claim 1, wherein the engine comprises an exhaust gas recirculation passage which recirculates part of the exhaust gas into an intake air of the engine, and the exhaust gas flow rate adjusting mechanism comprises an exhaust gas recirculation valve which varies an exhaust gas flow rate of the exhaust gas recirculation passage.

8. The regeneration device as defined in claim 1, wherein the regeneration device further comprises a sensor which detects a rotation speed of the engine and the controller is further programmed to determine whether or not the engine is in a predetermined rapid deceleration state according to a variation of the rotation speed of the engine.

9. A regeneration device for a filter which traps a particulate matter contained in the exhaust gas of an engine, the device regenerating the filter by burning the particulate matter trapped in the filter by raising a temperature of the filter, the device comprising:
  means for adjusting a temperature of the exhaust gas;
  means for adjusting a flow rate of the exhaust gas;
  means for determining whether or not a regeneration condition for the filter is satisfied;
  means for raising the temperature of the exhaust gas to a first target exhaust gas temperature via the exhaust gas temperature adjusting means when the regeneration condition is satisfied;
  means for determining whether or not the engine is in a predetermined rapid deceleration state; and
  means for controlling the temperature of the exhaust gas to a second target exhaust gas temperature lower than the first target exhaust gas temperature via the exhaust gas temperature adjusting means while increasing the flow rate of the exhaust gas via the exhaust gas flow rate adjusting means, when the engine is in the predetermined rapid deceleration state during regeneration.

10. A regeneration method for a filter which traps a particulate matter contained in the exhaust gas of an engine which is provided with an exhaust gas temperature adjusting mechanism which adjusts a temperature of the exhaust gas and an exhaust gas flow rate adjusting mechanism which adjusts a flow rate of the exhaust gas, the method regenerating the filter by burning the particulate matter trapped in the filter by raising a temperature of the filter, the method comprising:
  determining whether or not a regeneration condition for the filter is satisfied;
  raising the temperature of the exhaust gas to a first target exhaust gas temperature via the exhaust gas temperature adjusting mechanism when the regeneration condition is satisfied;
  determining whether or not the engine is in a predetermined rapid deceleration state; and
  controlling the temperature of the exhaust gas to a second target exhaust gas temperature lower than the first target exhaust gas temperature via the exhaust gas temperature adjusting mechanism while increasing the flow rate of the exhaust gas via the exhaust gas flow rate adjusting mechanism, when the engine is in the predetermined rapid deceleration state during regeneration.

* * * * *